(12) United States Patent
Liu et al.

(10) Patent No.: US 8,625,035 B2
(45) Date of Patent: Jan. 7, 2014

(54) DISPLAY DEVICE

(75) Inventors: Liang Liu, Beijing (CN); Chen Feng, Beijing (CN); Li Qian, Beijing (CN)

(73) Assignee: Beijing FUNATE Innovation Technology Co., Ltd., Beijing (CN)

( * ) Notice: Subject to any disclaimer, the term of this patent is extended or adjusted under 35 U.S.C. 154(b) by 737 days.

(21) Appl. No.: 12/894,498

(22) Filed: Sep. 30, 2010

(65) Prior Publication Data

US 2011/0285941 A1    Nov. 24, 2011

(30) Foreign Application Priority Data

May 19, 2010    (CN) ............................... 20101076752

(51) Int. Cl.
*G02F 1/1335*    (2006.01)
(52) U.S. Cl.
USPC ........................................................... 349/12
(58) Field of Classification Search
USPC ........................................................... 349/12
See application file for complete search history.

(56) References Cited

U.S. PATENT DOCUMENTS

| | | | | |
|---|---|---|---|---|
| 5,995,172 | A * | 11/1999 | Ikeda et al. | 349/12 |
| 8,253,870 | B2 * | 8/2012 | Qian et al. | 349/12 |
| 2006/0262236 | A1 * | 11/2006 | Abileah | 349/12 |
| 2009/0153503 | A1 | 6/2009 | Jiang et al. | |
| 2009/0153514 | A1 | 6/2009 | Jiang et al. | |
| 2009/0160796 | A1 | 6/2009 | Jiang et al. | |
| 2009/0160798 | A1 | 6/2009 | Jiang et al. | |
| 2010/0001971 | A1 | 1/2010 | Jiang et al. | |
| 2010/0182273 | A1 | 7/2010 | Noguchi et al. | |

FOREIGN PATENT DOCUMENTS

| | | |
|---|---|---|
| CN | 201097040 Y | 8/2008 |
| CN | 101286107 A | 10/2008 |
| CN | 201218888 Y | 4/2009 |
| CN | 201233481 Y | 5/2009 |
| CN | 101458593 A | 6/2009 |
| CN | 101458603 A | 6/2009 |
| CN | 101464765 A | 6/2009 |
| CN | 101587410 A | 11/2009 |
| TW | 200929644 | 7/2009 |
| TW | 201001010 | 1/2010 |
| TW | 201003500 | 1/2010 |

* cited by examiner

*Primary Examiner* — James Dudek
(74) *Attorney, Agent, or Firm* — Altis Law Group, Inc.

(57) ABSTRACT

A display device includes a liquid crystal display screen, a transparent conductive layer, and a number of capacitances. The liquid crystal display screen includes an upper substrate and an upper electrode disposed on the upper substrate. The upper electrode includes a number of first conductive bands having the largest electrical conductivity in a first direction. The transparent conductive layer is disposed on the upper substrate, and the transparent conductive layer and the upper electrode are located at opposite sides of the upper substrate. The transparent conductive layer includes a number of second conductive bands having the largest electrical conductivity in a second direction. A number of capacitances are formed at intersections of the first conductive bands and the second conductive bands.

14 Claims, 4 Drawing Sheets

US 8,625,035 B2

DISPLAY DEVICE

CROSS-REFERENCE TO RELATED APPLICATIONS

This application claims all benefits accruing under 35 U.S.C. §119 from China Patent Application No. 201010176752.5, filed on May 19, 2010, in the China Intellectual Property Office, the disclosure of which is incorporated herein by reference.

BACKGROUND

1. Technical Field

The present disclosure relates to display devices and, particularly, to a display device, which combines a carbon nanotube based touch panel with a liquid crystal display screen.

2. Description of Related Art

Liquid crystal displays (LCDs) are typically used as the display in various devices such as computers and vehicle and airplane instrumentation. Following the advancement in recent years of various electronic apparatuses toward high performance and diversification, there has been continuous growth in the number of electronic apparatuses equipped with optically transparent touch panels at the front of their respective display devices (e.g., liquid crystal panels). Users may operate a touch panel by pressing or touching the touch panel with a finger, a pen, a stylus, or tool while visually observing the liquid crystal display through the touch panel. Therefore, a demand exists for touch panels that are superior in visibility and reliable in operation.

Resistive, capacitive, infrared, and surface acoustic wave touch panels have been developed. Capacitive touch panels are widely applied because of the high accuracy and low cost of production.

A conventional display device usually has a conventional touch panel attached to a conventional liquid crystal display through double-coated tapes. However, the volume and weight of the conventional touch panel adversely increases the entire volume and weight of the conventional display device.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
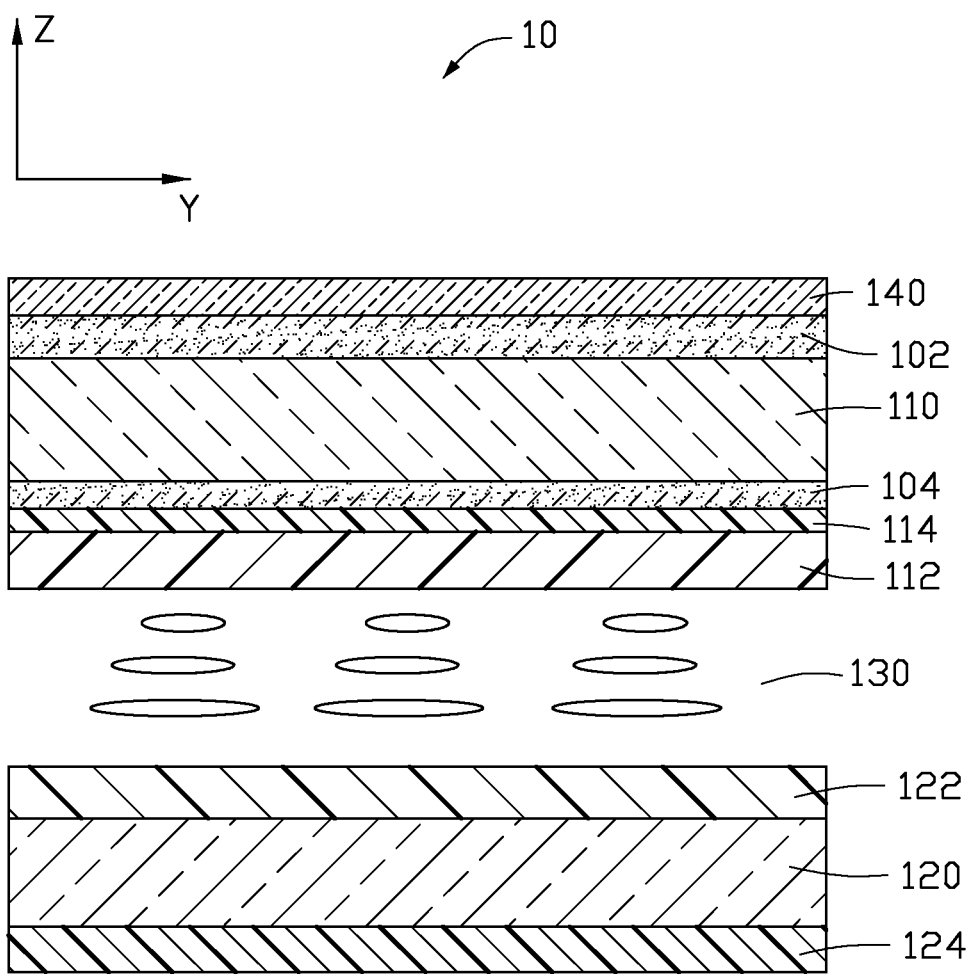
FIG. 1 is a schematic cross-section of an embodiment of a display device.
Figure 2:
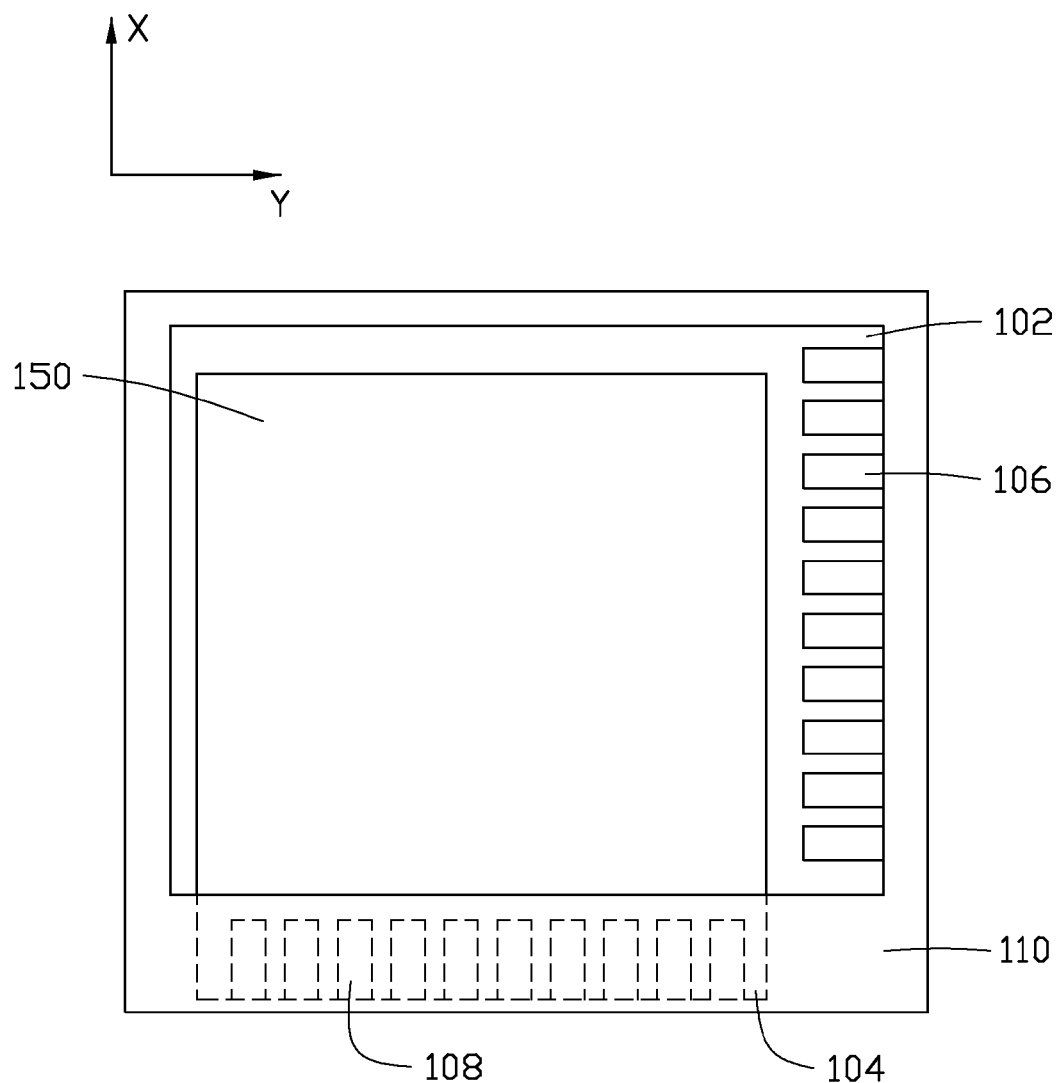
FIG. 2 is a schematic top view of the display device of FIG. 1.

Referring to FIG. 1 and FIG. 2, one embodiment of a display device 10 includes a touch panel and a liquid crystal display screen, which shares components with the touch panel.

In one embodiment, the touch panel can be a multi-touch capacitive touch panel. The multi-touch capacitive touch panel can include a common substrate 110, a first transparent conductive layer 102, a second transparent conductive layer 104, a number of first electrodes 106, and a number of second electrodes 108. Both the first transparent conductive layer 102 and the second transparent conductive layer 104 have good anisotropic electrical conductivity. The first transparent conductive layer 102 and the second transparent conductive layer 104 both have good light transmittance.

As shown in FIG. 1 and FIG. 2, the first transparent conductive layer 102 is disposed on a top surface of the common substrate 110. The first electrodes 106 are electrically connected with the first transparent conductive layer 102. The first electrodes 106 are disposed on one side of the first transparent conductive layer 102 at unequal intervals. The first electrodes 106 are formed in a row extending along a first direction X.

The second transparent conductive layer 104 is disposed on a bottom surface of the common substrate 110. The second electrodes 108 are electrically connected with the second transparent conductive layer 104. The second electrodes 108 can be disposed on one side of the second transparent conductive layer 104 at unequal intervals. The second electrodes 108 can be formed in a row extending along a second direction Y. The first direction X can be substantially perpendicular to the second direction Y. In other embodiments, the first direction X can cross with the second direction Y at an acute angle or an obtuse angle defined therebetween.

The first transparent conductive layer 102 overlaps the second transparent conductive layer 104 in a third direction Z, defined from the second transparent conductive layer 104 to the first transparent conductive layer 102. The third direction Z can be substantially perpendicular to the first direction X and the second direction Y. A touch region 150 is formed at the overlapped portions between the first transparent conductive layer 102 and the second transparent conductive layer 104.

The liquid crystal display screen shares the common substrate 110 and the second transparent conductive layer 104 with the above described touch panel. The liquid crystal display screen can further include a first polarizer 114, a first alignment layer 112, a liquid crystal layer 130, a second alignment layer 122, a thin film transistor panel 120, and a second polarizer 124.

The first polarizer 114 is disposed on a lower surface of the second transparent conductive layer 104. The first alignment layer 112 is disposed on a lower surface of the first polarizer 114. The second alignment layer 122 is disposed on an upper surface of the thin film transistor panel 120 and opposite to the first alignment layer 112. The liquid crystal layer 130 is disposed between the first alignment layer 112 and the second alignment layer 122. The second polarizer 124 is disposed on a lower surface of the thin film transistor panel 120.

The common substrate 110 can be used as a base of the multi-touch capacitive touch panel and as an upper substrate of the liquid crystal display screen. The second transparent conductive layer 104 can be used as a transparent conductive layer of the multi-touch capacitive touch panel to sense touch positions, and as an upper electrode of the liquid crystal display screen to apply a voltage to the liquid crystal layer 130. Thus, the display device 10 can have a low thickness, simple structure, and low cost.

In some embodiments, the first transparent conductive layer 102 can be a first carbon nanotube layer, and the second transparent conductive layer 104 can be a second carbon nanotube layer. Both the first carbon nanotube layer and the second carbon nanotube layer can be a carbon nanotube film having anisotropic electrical conductivity. Carbon nanotubes of the first carbon nanotube layer can be substantially arranged along the second direction Y, so that the first carbon nanotube layer has a larger electrical conductivity at the second direction Y than at other directions. Carbon nanotubes of the second carbon nanotube layer can be substantially arranged along the first direction X, so that the second carbon nanotube layer has a larger electrical conductivity at the first direction X than at other directions.

In some embodiments, both the first carbon nanotube layer and the second carbon nanotube layer comprise carbon nanotubes. In some embodiments, each of the first carbon nanotube layer and the second carbon nanotube layer can be or include at least one carbon nanotube drawn film.

The carbon nanotube drawn film includes a plurality of carbon nanotubes that can be arranged substantially parallel to a surface of the carbon nanotube drawn film. A large number of the carbon nanotubes in the carbon nanotube drawn film can be oriented along a preferred orientation, meaning that a large number of the carbon nanotubes in the carbon nanotube drawn film are arranged substantially along the same direction. An end of one carbon nanotube is joined to another end of an adjacent carbon nanotube arranged substantially along the same direction, by Van der Waals attractive force. A small number of the carbon nanotubes may be randomly arranged in the carbon nanotube drawn film, and has a small if not negligible effect on the larger number of the carbon nanotubes in the carbon nanotube drawn film arranged substantially along the same direction. The carbon nanotube drawn film is capable of forming a free-standing structure. The term "free-standing structure" can be defined as a structure that does not have to be supported by a substrate. For example, a free standing structure can sustain the weight of itself when it is hoisted by a portion thereof without any significant damage to its structural integrity. So, if the carbon nanotube drawn film is placed between two separate supporters, a portion of the carbon nanotube drawn film, not in contact with the two supporters, would be suspended between the two supporters and yet maintain film structural integrity. The free-standing structure of the carbon nanotube drawn film is realized by the successive carbon nanotubes joined end to end by Van der Waals attractive force.

Figure 3:
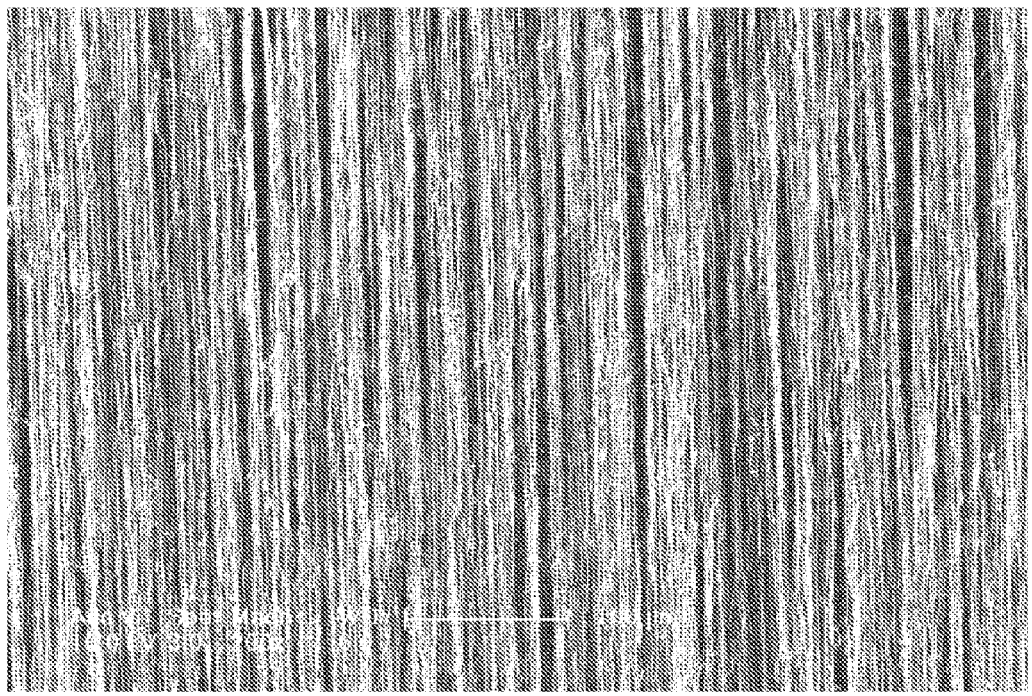
FIG. 3 shows a Scanning Electron Microscope (SEM) image of a carbon nanotube drawn film.

It can be appreciated that some variation can occur in the orientation of the carbon nanotubes in the carbon nanotube drawn film as can be seen in FIG. 3. Microscopically, the carbon nanotubes oriented substantially along the same direction may not be perfectly aligned in a straight line, and some curve portions may exist. It can be understood that some carbon nanotubes located substantially side by side and oriented along the same direction being contact with each other can not be excluded.

Figure 4:
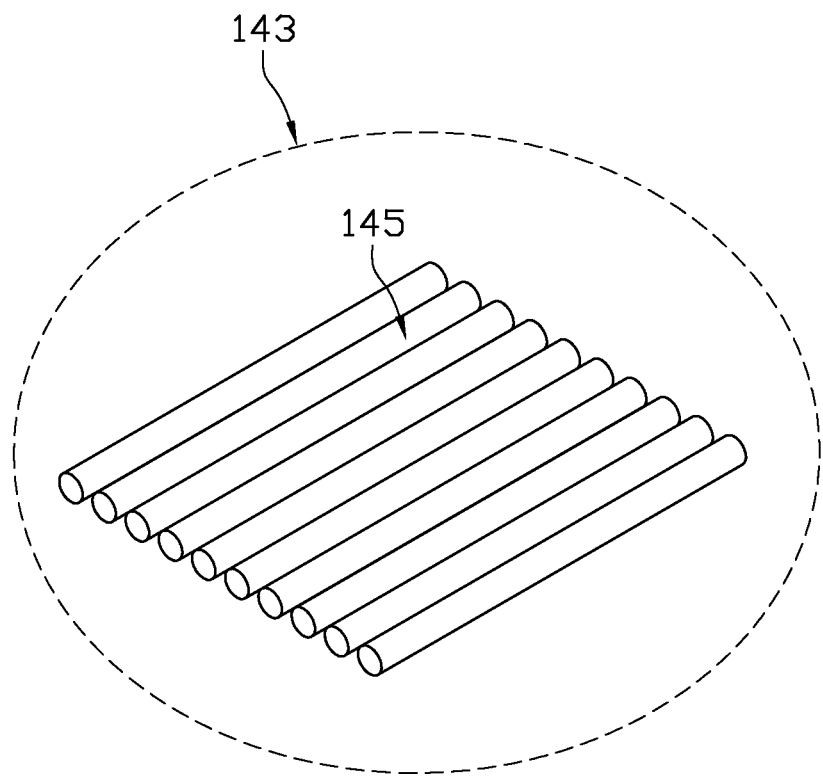
FIG. 4 is a schematic, enlarged view of a carbon nanotube segment.

More specifically, referring to FIG. 4, the carbon nanotube drawn film includes a plurality of successively oriented carbon nanotube segments 143 joined end-to-end by Van der Waals attractive force therebetween. Each carbon nanotube segment 143 includes a plurality of carbon nanotubes 145 substantially parallel to each other, and joined by Van der Waals attractive force therebetween. The carbon nanotube segments 143 can vary in width, thickness, uniformity, and shape. The carbon nanotubes 145 in the carbon nanotube drawn film are also substantially oriented along a preferred orientation.

In one embodiment, the carbon nanotube drawn film can be drawn out from an array of carbon nanotubes. The carbon nanotube drawn film can be formed by selecting one or more carbon nanotubes having a predetermined width from the array of carbon nanotubes, and pulling the carbon nanotubes at a roughly uniform speed to form carbon nanotube segments that are joined end to end to achieve a uniform carbon nanotube drawn film.

The carbon nanotube segments can be selected by using a tool, such as adhesive tape, pliers, tweezers, or other tools allowing multiple carbon nanotubes to be gripped and pulled simultaneously to contact with the array of carbon nanotubes. Referring to FIG. 4, each carbon nanotube segment 143 includes a plurality of carbon nanotubes 145 substantially parallel to each other, and combined by Van der Waals attractive force therebetween. The pulling direction can be substantially perpendicular to the growing direction of the array of carbon nanotubes.

The drawn carbon nanotube film has the smallest resistance at the pulling direction, and the largest resistance at a direction substantially perpendicular to the pulling direction.

In one embodiment, both of the first carbon nanotube layer and the second carbon nanotube layer includes a number of carbon nanotube drawn films located side by side or stacked with each other. Carbon nanotubes of the first carbon nanotube layer are arranged substantially along the second direction Y. Carbon nanotubes of the second carbon nanotube layer are arranged substantially along the first direction X. The length and width of the carbon nanotube drawn films are not limited, because the carbon nanotube drawn films can be located side by side or stacked with each other in the first carbon nanotube layer and the second carbon nanotube layer. In one embodiment, each carbon nanotube drawn film has a light transmittance greater than 85%, and the number of layers of the carbon nanotube drawn films is not limited, so long as the first carbon nanotube layer and the second carbon nanotube layer have proper light transmittance.

In some embodiments, each of the first carbon nanotube layer and the second carbon nanotube layer includes a carbon nanotube composite film. The carbon nanotube composite film includes a carbon nanotube drawn film and polymer materials infiltrating the carbon nanotube drawn film. Spaces can exist between adjacent carbon nanotubes in the carbon nanotube drawn film, and thus the carbon nanotube drawn film includes a number of micropores defined by the adjacent carbon nanotubes therein. The polymer material is filled into the micropores of the carbon nanotube drawn film to form the carbon nanotube composite film. The polymer materials can be distributed uniformly in the carbon nanotube composite film. The carbon nanotube composite film can include one or more carbon nanotube drawn films. The carbon nanotube composite film can have a uniform thickness. A thickness of the carbon nanotube composite film is only limited by the degree of transparency desired. In one embodiment, the thickness of the carbon nanotube composite film can range from about 0.5 nanometers to about 100 microns. The polymer material can be transparent, and not limited to a specific material. The polymer material can be polystyrene, polyethylene, polycarbonate, polymethyl methacrylate (PMMA), polycarbonate (PC), polyethylene terephthalate (PET), Benzo Cyclo Butene (BCB), or polyalkenamer. In one embodiment, the polymer material is PMMA.

In some embodiments, each of the first carbon nanotube layer and the second carbon nanotube layer includes at least one etched or laser-treated carbon nanotube drawn film. The etched or laser-treated carbon nanotube drawn film has an enhanced anisotropic electrical conductivity. For example, a number of cutting lines can be formed in the first carbon nanotube layer along the second direction through laser or etching.

The common substrate 110 can be a transparent plate. The common substrate 110 can be made of glass, quartz, diamond, plastic or resin. The thickness of the common substrate 110 can range from about 1 millimeter to about 1 centimeter. In one embodiment, the common substrate 110 is a PET film and the thickness of the common substrate 110 is about 2 millimeters.

The first electrodes 106 and the second electrodes 108 can include conductive materials, such as metals, conductive polymer materials, or carbon nanotubes. The metals can be gold, silver, copper or any other metal having a good conductivity. The conductive polymer materials can be polyacetylene, polyparaphenylene, polyaniline, or polythiophene. In one embodiment, the first electrodes 106 and the second electrodes 108 can be made of conductive silver pastes.

A transparent protective film 140 can be further located on the upper surface of the first transparent conductive layer 102. The material of the transparent protective film 140 can be silicon nitride, silicon dioxide, BCB, polyester, acrylic resin, PET, or any combination thereof. The transparent protective film 140 can also be a plastic film treated with surface hardening treatment. The transparent protective film 140 can reduce glare or reflection. In one embodiment, the material of the transparent protective film 140 is PET.

Because both of the first transparent conductive layer 102 and the second transparent conductive layer 104 have good anisotropic electrical conductivity, each portion of the first transparent conductive layer 102 contacting one of the first electrodes 106 can be equal to a conductive band. Similarly, the second transparent conductive layer 104 can also be equal to a number of conductive bands. The conductive bands of the first transparent conductive layer 102 are substantially perpendicular to the conductive bands of the second transparent conductive layer 104. Thus, a number of capacitances are formed at the intersections of the conductive bands of the first transparent conductive layer 102 and the second transparent conductive layer 104. In operation of the touch panel, one or more contacts can be made with the touch panel from one or more contact tools (not shown), such as fingers or a stylus. Capacitances of the contact points will change and can be detected by external circuits connected with the first electrodes 106 and the second electrodes 108. The coordinates of the contact points on the touch panel can be obtained.

In the liquid crystal display screen, a material of the first polarizer 114 can be conventional polarizing material, such as dichroism organic polymer materials. In some embodiments, the material of the first polarizer 114 can be iodine material or dyestuff material.

The second polarizer 124 can be made of the same material as the first polarizer 114. The second polarizer 124 is used to polarize the light beams emitted from the light guide plate (not shown) located on the surface of the liquid crystal display screen facing away from the thin film transistor panel 120, and thus acquire polarized light beams along a same direction. The polarization direction of the second polarizer 124 is substantially perpendicular to the polarization direction of the first polarizer 114.

The first alignment layer 112 can include a number of substantially parallel first grooves (not shown) formed thereon. The first grooves are located on a lower surface of the first alignment layer 112 opposing the liquid crystal layer 130. The first grooves are used to make the liquid crystal molecules align along a same direction. The second alignment layer 122 can include a number of substantially parallel second grooves (not shown) formed thereon. The second grooves are located on an upper surface of the second alignment layer 122 opposing the liquid crystal layer 130.

An alignment direction of the first grooves is substantially perpendicular to an alignment direction of the second grooves. The second grooves are used to make the liquid crystal molecules align substantially along a same direction. Because the alignment direction of the first grooves is substantially perpendicular to the alignment direction of the second grooves, the alignment direction of the liquid crystal molecules differ by about 90 degrees between the first alignment layer 112 and the second alignment layer 122, which play a role of shifting the light beams polarized by the second polarizer 122 by 90 degrees.

The material of the first alignment layer 112 and the second alignment layer 122 can be polystyrenes and derivatives of the polystyrenes, polyimides, polyvinyl alcohols, polyesters, epoxy resins, polyurethanes, or other polysilanes. The first grooves and the second grooves can be formed by a rubbing method, a tilt deposition method, a micro-grooves treatment method, or a SiOx-depositing method. In one embodiment, a material of the first alignment layer 112 and the second alignment layer 122 is polyimide and a thickness thereof ranges from about 1 micrometer to about 50 micrometers.

The liquid crystal layer 130 includes a number of cigar shaped liquid crystal molecules. Understandably, the liquid crystal layer 130 can also be made of other conventional suitable materials, such as alkyl benzoic acid, alkyl cyclohexyl acid, alkyl cyclohexyl-phenol, and phenyl cyclohexane. A thickness of the liquid crystal layer 130 ranges from about 1 micrometer to about 50 micrometers. In one embodiment, a thickness of the liquid crystal layer 130 is about 5 micrometers.

The detailed structure of the thin film transistor panel 120 is not shown in FIG. 1. It is to be understood that the thin film transistor panel 120 can further include a transparent base, a number of thin film transistors located on the transparent base, a number of pixel electrodes, and a display driver circuit (not shown). The thin film transistors correspond to the pixel electrodes in a one-to-one manner. The thin film transistors are connected to the display driver circuit by the source lines and gate lines. The pixel electrodes are controlled to cooperate with the second transparent conductive layer 104, to apply a voltage to the liquid crystal layer 130. The pixel electrodes correspond to the touch region 150.

As described above, the liquid crystal display screen shares the common substrate 110 and the second transparent conductive layer 104 with the above described touch panel. Thus, the display device 10 can have a low thickness, simple structure, and low cost.

It is to be understood that the described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The disclosure illustrates but does not restrict the scope of the disclosure.

What is claimed is:

1. A display device comprising a touch panel and a liquid crystal displace wherein the touch panel comprises:
    a common substrate having a first surface and an opposite second surface;

a first transparent conductive layer having conductive anisotropy disposed on the first surface of the common substrate;

a plurality of first electrodes electrically connecting to the first transparent conductive layer, the plurality of first electrodes being spaced and arranged along a first direction;

a second transparent conductive layer having conductive anisotropy disposed on the second surface of the common substrate; and a plurality of second electrodes electrically connecting to the second transparent conductive layer, the plurality of second electrodes being spaced and arranged along a second direction;

wherein the liquid crystal display comprises:

an upper substrate;

an upper electrode;

a first polarizer disposed on the second transparent conductive layer, such that the second transparent conductive layer is between the common substrate and the first polarizer;

a first alignment layer disposed on the first polarizer, such that the first polarizer is between the second transparent conductive layer and the first alignment layer;

a second alignment layer spaced from and opposite to the first alignment layer;

a liquid crystal layer disposed between the first alignment layer and the second alignment layer;

a thin film transistor panel disposed on the second alignment layer, such that the second alignment layer is between the liquid crystal layer and the thin film transistor panel; and a second polarizer disposed on the thin film transistor panel, such that the thin film transistor panel is between the second polarizer and the second alignment layer, wherein the first transparent conductive layer has a larger electrical conductivity in the second direction than any other direction, and the second transparent conductive layer has a larger electrical conductivity in the first direction than any other direction;

wherein the upper substrate is the common substrate of the touch panel and the upper electrode is the second transparent conductive layer of the touch panel.

2. The display device of claim 1, wherein the first direction is substantially perpendicular to the second direction.

3. The display device of claim 1, wherein the first transparent conductive layer is a first carbon nanotube layer, and the second transparent conductive layer is a second carbon nanotube layer; each of the first carbon nanotube layer and the second carbon nanotube layer comprises a plurality of carbon nanotubes; the plurality of carbon nanotubes of the first carbon nanotube layer are substantially arranged along the second direction; the plurality of carbon nanotubes of the second carbon nanotube layer are substantially arranged along the first direction.

4. The display device of claim 3, wherein the plurality of carbon nanotubes of the first carbon nanotube layer form one carbon nanotube film; the plurality of carbon nanotubes of the second carbon nanotube layer form one carbon nanotube film.

5. The display device of claim 4, wherein a plurality of cutting lines are formed in the first carbon nanotube layer along the second direction, and a plurality of cutting lines are formed in the second carbon nanotube layer along the first direction.

6. The display device of claim 3, wherein the plurality of carbon nanotubes of the first carbon nanotube layer form a plurality of carbon nanotube films; the plurality of carbon nanotubes of the second carbon nanotube layer form a plurality of carbon nanotube films.

7. The display device of claim 6, wherein the plurality of carbon nanotube films of the first carbon nanotube layer are located side by side or stacked with each other, and the plurality of carbon nanotube films of the second carbon nanotube layer are located side by side or stacked with each other.

8. The display device of claim 6, wherein a plurality of cutting lines are formed in the first carbon nanotube layer along the second direction, and a plurality of cutting lines are formed in the second carbon nanotube layer along the first direction.

9. The display device of claim 1, wherein the first transparent conductive layer comprises a carbon nanotube composite film which comprises at least one carbon nanotube drawn film and polymer materials infiltrating the at least one carbon nanotube drawn film.

10. The display device of claim 9, wherein the second transparent conductive layer comprises a carbon nanotube composite film which comprises at least one carbon nanotube drawn film and polymer materials infiltrating the at least one carbon nanotube drawn film of the second transparent conductive layer.

11. The display device of claim 1, further comprising a transparent protective film disposed on the first transparent conductive layer, such that the first transparent conductive layer is disposed between the transparent protective film and the common substrate.

12. A display device comprising:

a first polarizer; a first alignment layer; a liquid crystal layer; a second alignment layer; a thin film transistor panel; a second polarizer; and a touch panel;

wherein the touch panel comprises:

a common substrate having a first surface and an opposite second surface;

a first transparent conductive layer having conductive anisotropy disposed on the first surface of the common substrate;

a plurality of first electrodes electrically connecting to the first transparent conductive layer, the plurality of first electrodes being spaced and arranged along a first direction;

a second transparent conductive layer having conductive anisotropy disposed on the second surface of the common substrate;

a plurality of second electrodes electrically connecting to the second transparent conductive layer, the plurality of second electrodes being spaced and arranged along a second direction;

wherein the first polarizer, the first alignment layer, the liquid crystal layer, the second alignment layer, the thin film transistor panel, and the second polarizer are stacked on each other in sequence along a direction from the first surface to the second surface of the common substrate; the first polarizer is disposed on the second transparent conductive layer; the second transparent conductive layer is between the common substrate and first polarizer.

13. The display device of claim 12, wherein the first direction is substantially perpendicular to the second direction.

14. The display device of claim 12, further comprising a transparent protective film disposed on the first transparent conductive layer, such that the first transparent conductive layer is disposed between the transparent protective film and the common substrate.

* * * * *